(12) United States Patent
Arafat et al.

(10) Patent No.: US 12,017,544 B2
(45) Date of Patent: Jun. 25, 2024

(54) FAULT TOLERANT INVERTER FOR PARTIAL PHASE LOSS IN MULTI-PHASE MACHINES

(71) Applicants: Cummins Inc., Columbus, IN (US); Akm Arafat, Blaine, MN (US); Santhosh Krishnamoorthi, Fridley, MN (US); Dakshina Subbarao Murthy-Bellur, Minneapolis, MN (US)

(72) Inventors: Akm Arafat, Blaine, MN (US); Santhosh Krishnamoorthi, Fridley, MN (US); Dakshina Subbarao Murthy-Bellur, Minneapolis, MN (US)

(73) Assignee: CUMMINS INC., Columbus, IN (US)

( * ) Notice: Subject to any disclaimer, the term of this patent is extended or adjusted under 35 U.S.C. 154(b) by 179 days.

(21) Appl. No.: 17/765,516

(22) PCT Filed: Nov. 22, 2019

(86) PCT No.: PCT/IB2019/060083
§ 371 (c)(1),
(2) Date: Mar. 31, 2022

(87) PCT Pub. No.: WO2021/099824
PCT Pub. Date: May 27, 2021

(65) Prior Publication Data
US 2022/0371444 A1 Nov. 24, 2022

(51) Int. Cl.
*H02M 1/32* (2007.01)
*B60L 3/00* (2019.01)

(52) U.S. Cl.
CPC .......... *B60L 3/0061* (2013.01); *B60L 3/0092* (2013.01); *H02M 1/325* (2021.05)

(58) Field of Classification Search
CPC .................................................. H02M 1/325
See application file for complete search history.

(56) References Cited

U.S. PATENT DOCUMENTS

| 5,414,339 | A | 5/1995 | Masaki |
| 8,872,455 | B2 | 10/2014 | Tremel |

(Continued)

FOREIGN PATENT DOCUMENTS

| CN | 203206173 U | 9/2013 | |
| CN | 104617759 A * | 5/2015 | ............. H02M 1/32 |

(Continued)

OTHER PUBLICATIONS

International patent application No. PCT/IB2019/060083, filed Nov. 22, 2019, dated Mar. 11, 2020.

(Continued)

*Primary Examiner* — Sisay G Tiku
(74) *Attorney, Agent, or Firm* — Faegre Drinker Biddle & Reath LLP (57) ABSTRACT

A method and system of operating a multi-phase electric machine include operating an inverter to control the multi-phase machine. The inverter has a plurality of inverter legs including an auxiliary inverter leg. Each of the plurality of inverter legs has at least one switch device. The multi-phase machine has a plurality of phases in which each phase is controlled by a respective inverter leg of the inverter. The method and system also include determining whether a phase of the multi-phase machine is experiencing a partial phase loss, for example, by injecting a signal into the phases and analyzing the frequency response. In response to determining that a phase of the multi-phase machine is experiencing a partial phase loss, the method and system include utilizing the auxiliary inverter leg to supplement energy to the phase experiencing the partial phase loss to continue operating the multi-phase machine.

20 Claims, 4 Drawing Sheets

(56) References Cited

U.S. PATENT DOCUMENTS

| | | |
|---|---|---|
| 9,024,564 B2 | 5/2015 | Kinouchi |
| 9,438,144 B2 | 9/2016 | Xu |
| 2007/0179720 A1 | 8/2007 | Becker et al. |
| 2017/0008405 A1 | 1/2017 | Bojarski et al. |
| 2017/0305283 A1 | 10/2017 | Huh et al. |
| 2018/0241337 A1 | 8/2018 | Zou et al. |
| 2019/0049507 A1 | 2/2019 | Daigle et al. |

FOREIGN PATENT DOCUMENTS

| | | | | |
|---|---|---|---|---|
| CN | 105577071 A | | 5/2016 | |
| CN | 116087830 A | * | 5/2023 | |
| WO | 2017053331 A1 | | 3/2017 | |
| WO | WO-2017053331 A1 | * | 3/2017 | ............... E21B 4/02 |
| WO | 2017083521 A1 | | 5/2017 | |

OTHER PUBLICATIONS

International Preliminary Report on Patentability received for PCT Patent Application No. PCT/IB2019/060083, dated Jun. 2, 2022, 6 pages.
International Search Report and Written Opinion received for PCT Patent Application No. PCT/IB2019/060083, dated Mar. 11, 2020, 6 pages.

\* cited by examiner

FAULT TOLERANT INVERTER FOR PARTIAL PHASE LOSS IN MULTI-PHASE MACHINES

CROSS-REFERENCE TO RELATED APPLICATION

This application claims priority to International Patent Application No. PCT/IB2019/060083, filed Nov. 22, 2019, the complete disclosure of which is incorporated herein by reference in its entirety.

FIELD OF THE DISCLOSURE

The present disclosure generally relates to inverters for multi-phase electric machines, and more particularly to techniques for operating an inverter to control a multi-phase machine when the multi-phase machine experiences a partial phase loss.

BACKGROUND OF THE DISCLOSURE

Multi-phase electric machines are utilized in various applications including electric vehicles. For example, a drive system of an electric vehicle typically includes an alternating current (AC) electric motor driven by a direct current (DC) power source (e.g., a main battery). The AC electric motor is coupled to the DC power source via an inverter which performs switching functions to convert the DC power to AC power.

Figure 1:
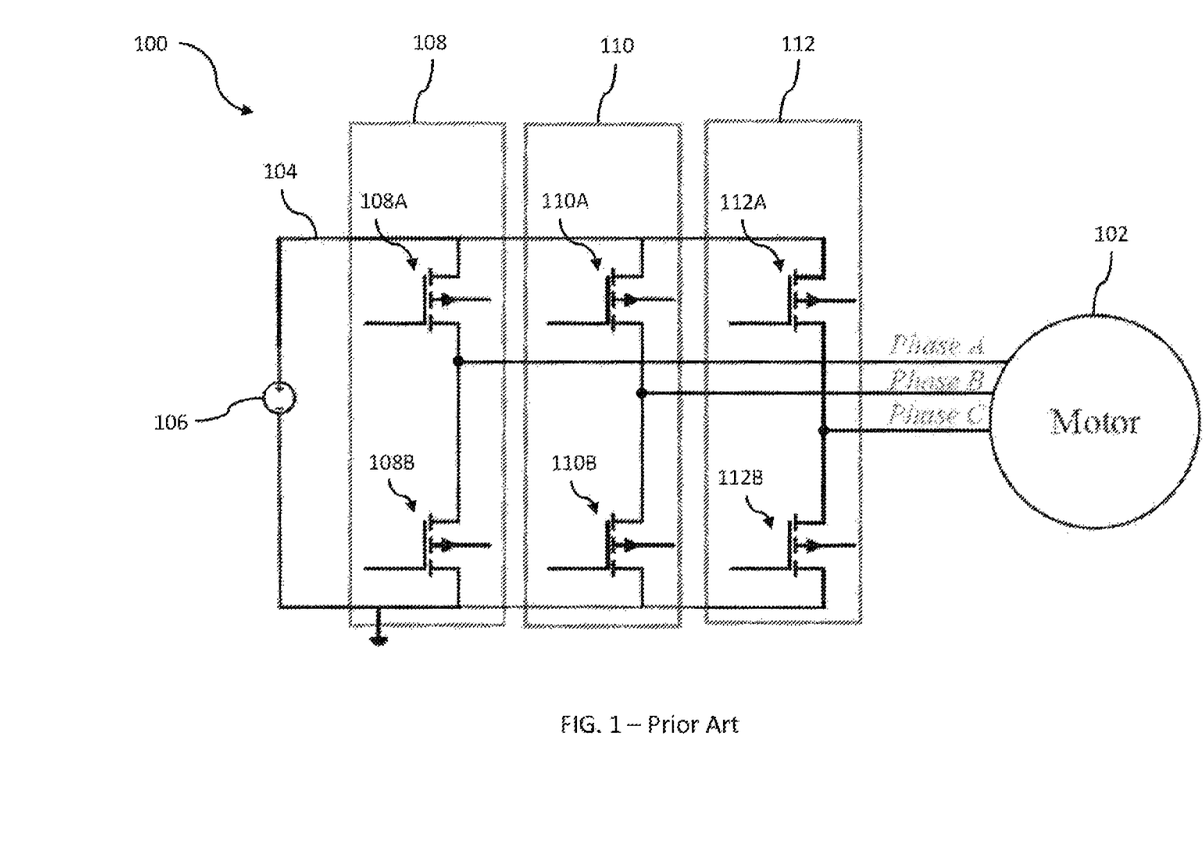
FIG. 1 is a block diagram of a prior art three-phase system.

A conventional three-phase system 100 for an electric vehicle is shown in FIG. 1. System 100 includes a three-phase AC motor 102, an inverter 104, and a DC power source 106. Inverter 104 has three inverter legs 108-112 corresponding to the three phases (e.g., phases A-C) of motor 102. Inverter leg 108 has a pair of switch devices 108A, 108B used to control phase A. Inverter leg 110 has a pair of switch devices 110A, 110B used to control phase B. Inverter leg 112 has a pair of switch devices 112A, 112B used to control phase C.

A partial phase loss is a common fault that can occur in system 100 due to, for example, partial damage to the windings of motor 102. The partial phase loss can disrupt the operation of motor 102 and lead to safety consequences. As such, the fault tolerance capability of system 100 is critical. Existing solutions rely on employing an additional inverter to provide redundancy in the system. However, having another inverter is not an optimal solution when it comes to minimizing power output per cost. Such solution also increases the overall system cost and implementation complexity. Accordingly, there remains a need to develop more efficient techniques for operating an inverter to control the operation of a multi-phase machine when the multi-phase machine experiences a partial phase loss.

SUMMARY

According to one embodiment, the present disclosure provides a method by a controller to operate an inverter to control a multi-phase machine. The inverter has a plurality of inverter legs including an auxiliary inverter leg. Each of the plurality of inverter legs includes at least one switch device. The multi-phase machine has a plurality of phases with each phase being controlled by a respective inverter leg of the inverter. The method includes determining whether a phase in the multi-phase machine is experiencing a partial phase loss. In response to determining that a phase in the multi-phase machine is experiencing a partial phase loss, the method includes utilizing the auxiliary inverter leg to supplement energy to the phase experiencing the partial phase loss to continue operating the multi-phase machine.

In a further aspect, the method includes operating a set of connection switches to connect the auxiliary inverter leg to the phase experiencing the partial phase loss. By connecting the auxiliary inverter leg to the phase experiencing the partial phase loss, an additional current is supplied from the auxiliary inverter leg to the phase experiencing the partial phase loss.

In another aspect, the method includes detecting a partial imbalance in the plurality of phases in the multi-phase machine to determine the phase experiencing the partial phase loss. In one example, to detect the partial imbalance, the method includes comparing the phase-to-neutral voltages for the plurality of phases in the multi-phase machine and determining whether a difference between the phase-to-neutral voltages is equal to a threshold. In another example, to detect the partial imbalance, the method includes injecting a signal to each of the plurality of phases in the multi-phase machine through the auxiliary inverter leg and analyzing a frequency response of the signal in each of the plurality of phases to determine whether the partial imbalance exists.

According to another embodiment, the present disclosure provides a controller that includes a processor and a memory. The memory includes instructions that, when executed by the processor, cause the controller to operate an inverter to control a multi-phase machine. The inverter has a plurality of inverter legs including an auxiliary inverter leg. Each of the plurality of inverter legs includes at least one switch device. The multi-phase machine has a plurality of phases with each phase being controlled by a respective inverter leg of the inverter. The processor also causes the controller to determine whether a phase in the multi-phase machine is experiencing a partial phase loss. In response to determining that a phase in the multi-phase machine is experiencing a partial phase loss, the processor causes the controller to utilize the auxiliary inverter leg to supplement energy to the phase experiencing the partial phase loss to continue operating the multi-phase machine.

In a further aspect, the processor causes the controller to operate a set of connection switches to connect the auxiliary inverter leg to the phase experiencing the partial phase loss. By connecting the auxiliary inverter leg to the phase experiencing the partial phase loss, an additional current is supplied from the auxiliary inverter leg to the phase experiencing the partial phase loss.

In another aspect, the processor causes the controller to detect a partial imbalance in the plurality of phases in the multi-phase machine to determine the phase experiencing the partial phase loss. In one example, to detect the partial imbalance, the processor causes the controller to compare the phase-to-neutral voltages for the plurality of phases in the multi-phase machine and determine whether a difference between the phase-to-neutral voltages is equal to a threshold. In another example, to detect the partial imbalance, the processor causes the controller to inject a signal to each of the plurality of phases in the multi-phase machine through the auxiliary inverter leg and analyze a frequency response of the signal in each of the plurality of phases to determine whether the partial imbalance exists.

According to yet another embodiment, the present disclosure provides a system that includes an inverter, a multi-phase machine and a controller coupled to the inverter and the multi-phase machine. The inverter has a plurality of inverter legs including an auxiliary inverter leg. Each of the plurality of inverter legs includes at least one switch device. The multi-phase machine has a plurality of phases with each phase being controlled by a respective inverter leg of the inverter. The controller is configured to determine whether a phase in the multi-phase machine is experiencing a partial phase loss. In response to determining that a phase in the multi-phase machine is experiencing a partial phase loss, the controller is configured to utilize the auxiliary inverter leg to supplement energy to the phase experiencing the partial phase loss to continue operating the multi-phase machine.

In a further aspect, the system includes a set of connection switches and the controller is configured to operate the set of connection switches to connect the auxiliary inverter leg to the phase experiencing the partial phase loss. By connecting the auxiliary inverter leg to the phase experiencing the partial phase loss, an additional current is supplied from the auxiliary inverter leg to the phase experiencing the partial phase loss. The controller is also configured to detect a fault condition causing the partial phase loss in the phase and generate a signal to indicate the fault condition. The multi-phase machine may be a three-phase machine.

In another aspect, the controller is configured to detect a partial imbalance in the plurality of phases in the multi-phase machine to determine the phase experiencing the partial phase loss. In one example, to detect the partial imbalance, the controller is configured to compare the phase-to-neutral voltages for the plurality of phases in the multi-phase machine and determine whether a difference between the phase-to-neutral voltages is equal to a threshold. In another example, to detect the partial imbalance, the controller is configured to inject a signal to each of the plurality of phases in the multi-phase machine through the auxiliary inverter leg and analyze a frequency response of the signal in each of the plurality of phases to determine whether the partial imbalance exists.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

Figure 2:
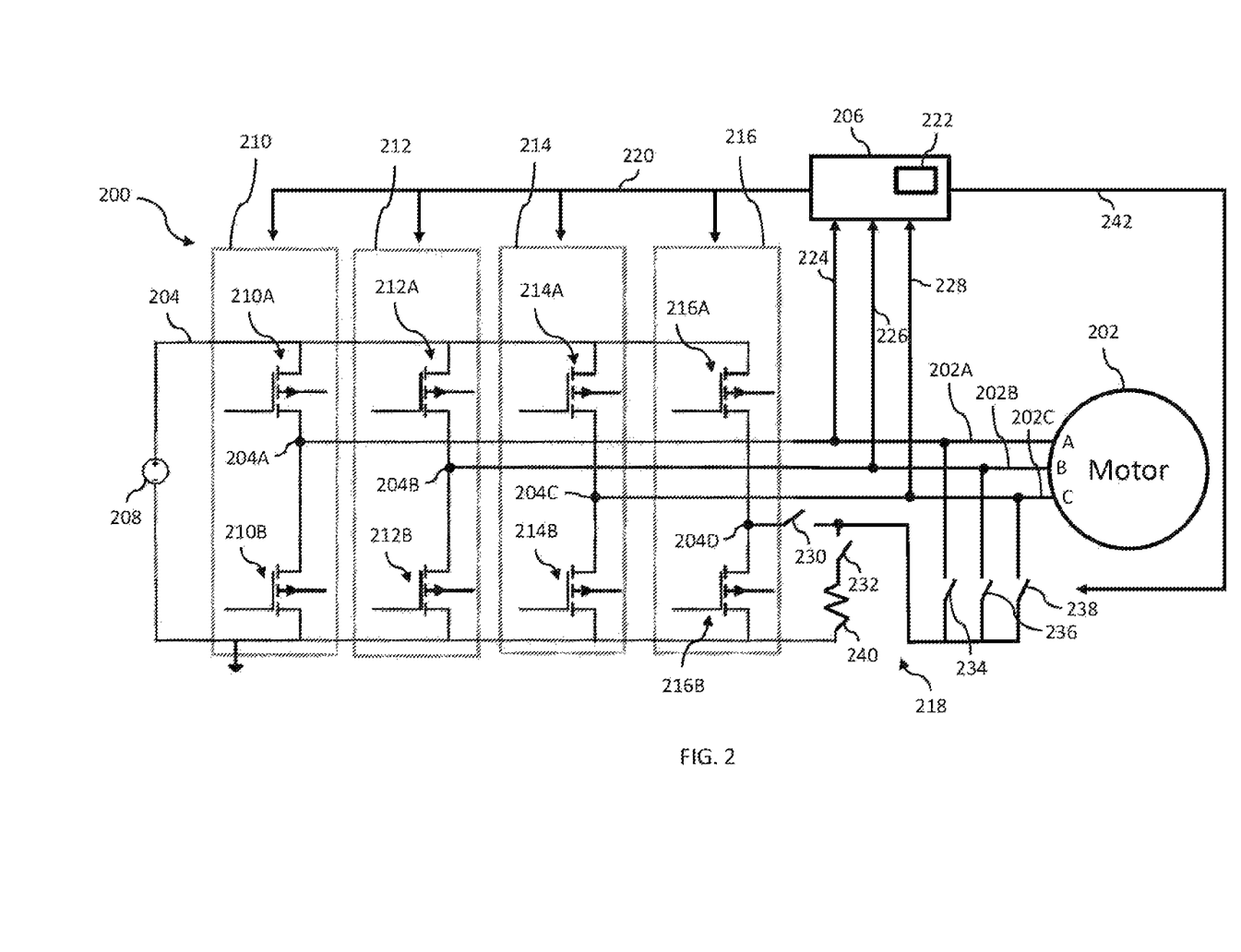
FIG. 2 is a block diagram of a fault-tolerant three-phase system.

Referring now to FIG. 2, a block diagram of a fault-tolerant three-phase system 200 is shown including a three-phase AC machine 202, an inverter 204, and a controller 206. Controller 206 operates three-phase AC machine 202 via inverter 204 such that three-phase AC machine 202 can use DC power inputs provided to inverter 204 by a DC power source 208. As used herein, the term "AC machine" refers to an AC powered device that converts electrical energy to mechanical energy or vice versa. AC machines can be classified into synchronous AC machines and asynchronous AC machines. Synchronous AC machines can include permanent magnet machines and reluctance machines. It should be appreciated that the disclosed embodiments can relate to any type of multi-phase AC machine for any number of applications.

In the embodiment of FIG. 2, three-phase AC machine 202 may be a three-phase asymmetric permanent magnet synchronous AC motor used to provide torque in an electric vehicle. Three-phase AC motor 202 has three windings 202A, 202B and 202C connected to terminals 204A, 204B and 204C, respectively of inverter 204. Each winding 202A-202C is associated with a respective phase A-C of three-phase AC motor 202. Windings 202A-202C are coupled together at a neutral point inside AC motor 202 (not shown). As such, currents flowing into winding 202A can flow out of windings 202B, 202C, currents flowing into winding 202B can flow out of windings 202A, 202C, and currents flowing into winding 202C can flow out of windings 202A, 202B.

Windings 202A-202C represent a stator of three-phase AC motor 202. For ease of illustration, the stator and other components (e.g., rotor, shaft, etc.) of three-phase AC motor 202 are not shown. Generally, the rotor is mounted to the shaft and the rotor is separated from the stator by an air gap. When utilized as a motor, the stator causes the rotor to rotate utilizing electrical energy thereby rotating the shaft to provide mechanical energy. On the other hand, when utilized as a generator, the shaft is rotated by an external mechanical force that causes the rotor to rotate thereby causing the stator to generate electrical energy.

Inverter 204 has a plurality of inverter legs including an inverter leg 210 connected to winding 202A via terminal 204A, an inverter leg 212 connected to winding 202B via terminal 204B, an inverter leg 214 connected to winding 202C via terminal 204C, and an auxiliary inverter leg 216 that can be selectively connected to any of windings 202A-202C via one or more connection switches 218. Each inverter leg 210-216 includes at least one switch device. In particular, inverter leg 210 includes a pair of switch devices 210A, 210B, inverter leg 212 includes a pair of switch devices 212A, 212B, inverter leg 214 includes a pair of switch devices 214A, 214B, and auxiliary inverter leg 216 includes a pair of switch devices 216A, 216B. Switch devices 210A, 210B, 212A, 212B, 214A, 214B, 216A, 216B may be any type of solid-state switch devices such as insulated-gate bipolar transistors (IGBTs) or metal-oxide-semiconductor field-effect transistors (MOSFETs). In various embodiments, switch devices 210A, 210B, 212A, 212B, 214A, 214B, 216A, 216B may be connected with one or more protection devices such as one or more freewheeling diodes. Switch devices 210A, 210B, 212A, 212B, 214A, 214B, 216A, 216B operate to switch DC voltages and provide energization to windings 202A-202C. In one example, inverter 204 is a pulse width modulated (PWM) inverter. As such, the duty ratios of switch devices 210A, 212A and 214A are phase shifted by 120 degrees (electrical), with the duty ratios of switch devices 210B, 212B and 214B being complementary.

Controller 206 receives operating signals from three-phase AC motor 202 and generates a control signal 220 to control the switching operations of inverter 204 to thereby control the outputs (e.g., currents) provided to windings 202A-202C. Controller 206 also includes a fault detection unit 222 that receives information associated with three-phase AC motor 202 and/or inverter 204 to determine faults. For example, fault detection unit 222 may receive signals 224-228 from sensors indicating various characteristics of the currents and/or voltages provided to windings 202A-202C. As another example, fault detection unit 222 may receive signals 224-228 from sensors indicating the physical conditions of windings 202A-202C. Fault detection unit 222 processes the received information and determines whether a fault has occurred with respect to one or more phases (e.g., phases A-C) in AC motor 202. While FIG. 2 shows fault detection unit 222 as being a part of controller 206, in other embodiments, fault detection unit 222 may be a separate unit that is communicatively coupled to controller 206.

In one example, fault detection unit 222 determines a partial phase loss fault in three-phase AC motor 202. A partial phase loss is a common fault in which the current flow in a phase is reduced. This may be caused by partial winding damages, insulation issues, moisture accumulations, and/or other events that reduce the phase current. Fault detection unit 222 can determine a partial phase loss by monitoring for partial imbalances in the phases of AC motor 202. For example, fault detection unit 222 compares the phase-to-neutral voltages of the phases and determines whether a difference between the phase-to-neutral voltages is equal to a threshold indicator k. That is, a partial imbalance exists if $V_{AN}-V_{BN}=V_{BN}-V_{CN}=V_{CN}-V_{AN}=k$, where $V_{AN}$ is the phase-to-neutral voltage for phase A, $V_{BN}$ is the phase-to-neutral voltage for phase B, and $V_{CN}$ is the phase-to-neutral voltage for phase C. The threshold indicator k can be set based on a user requirement of how much partial imbalance is to be tolerated in the system. After detecting the partial imbalance, fault detection unit 222 can determine which phase is suffering from the partial phase loss by examining which phase has the smallest current. Other suitable methods of determining partial phase losses may be contemplated in other embodiments.

Once the partial phase loss fault is determined, fault detection unit 222 generates information (e.g., a fault signal) to indicate the fault. The information can indicate which phase is presently experiencing the partial phase loss and/or what type of fault condition caused the problem (e.g., partial winding damage). In some implementations, fault detection unit 222 provides a fault signal to an output unit (e.g., a display, an indicator light, a speaker, etc.) to indicate the partial phase loss fault to an observer (e.g., an operator of an electric vehicle).

In some embodiments, controller 206 may include a non-transitory memory having instructions that, in response to execution by a processor, cause the processor to perform the functions of controller 206 and/or fault detection unit 222 as described above. The processor, non-transitory memory and controller 106 are not particularly limited and can, for example, be physically separate.

In some embodiments, controller 206 can form a portion of a processing subsystem including one or more computing devices having memory, processing, and communication hardware. Controller 206 can be a single device or a distributed device, and functions of controller 206 can be performed by hardware and/or as computer instructions on a non-transient computer readable storage medium, such as the non-transitory memory.

In some embodiments, controller 206 includes one or more interpreters, determiners, evaluators, regulators, and/or processors that functionally execute the operations of controller 206. Interpreters, determiners, evaluators, regulators, and processors can be implemented in hardware and/or as computer instructions on a non-transient computer readable storage medium, and can be distributed across various hardware or computer-based components.

When a partial phase loss occurs, it is not necessary to completely isolate the faulty phase. Instead, controller 206 can utilize auxiliary inverter leg 216 to supplement energy to the phase experiencing the partial phase loss. To do so, controller 206 activates auxiliary inverter leg 216 and connection switches 218 to connect a terminal 204D of auxiliary inverter leg 216 to three-phase AC motor 202. In some embodiments, auxiliary inverter leg 216 is already activated and controller 206 merely triggers connection switches 218 to connect or disconnect auxiliary inverter leg 216 to AC motor 202.

Connection switches 218 include leg switches 230, 232 and fault switches 234-238. Under healthy conditions, if auxiliary inverter leg 216 is activated, then leg switches 230, 232 are normally closed to maintain dynamic braking capabilities (e.g., release extra energy for thermal management purposes during regeneration) through a dynamic braking resistor 240. Under a partial phase loss fault, leg switch 232 is opened to bypass dynamic braking resistor 240. Fault switches 234-238, which are normally opened under healthy conditions, are selectively triggered to be closed during the partial phase loss fault. In particular, depending on which phase is experiencing the partial phase loss, one of fault switches 234-238 will be closed in order to connect the output (e.g., terminal 204D) of auxiliary inverter leg 216 to the phase experiencing the partial phase loss.

Figure 3:
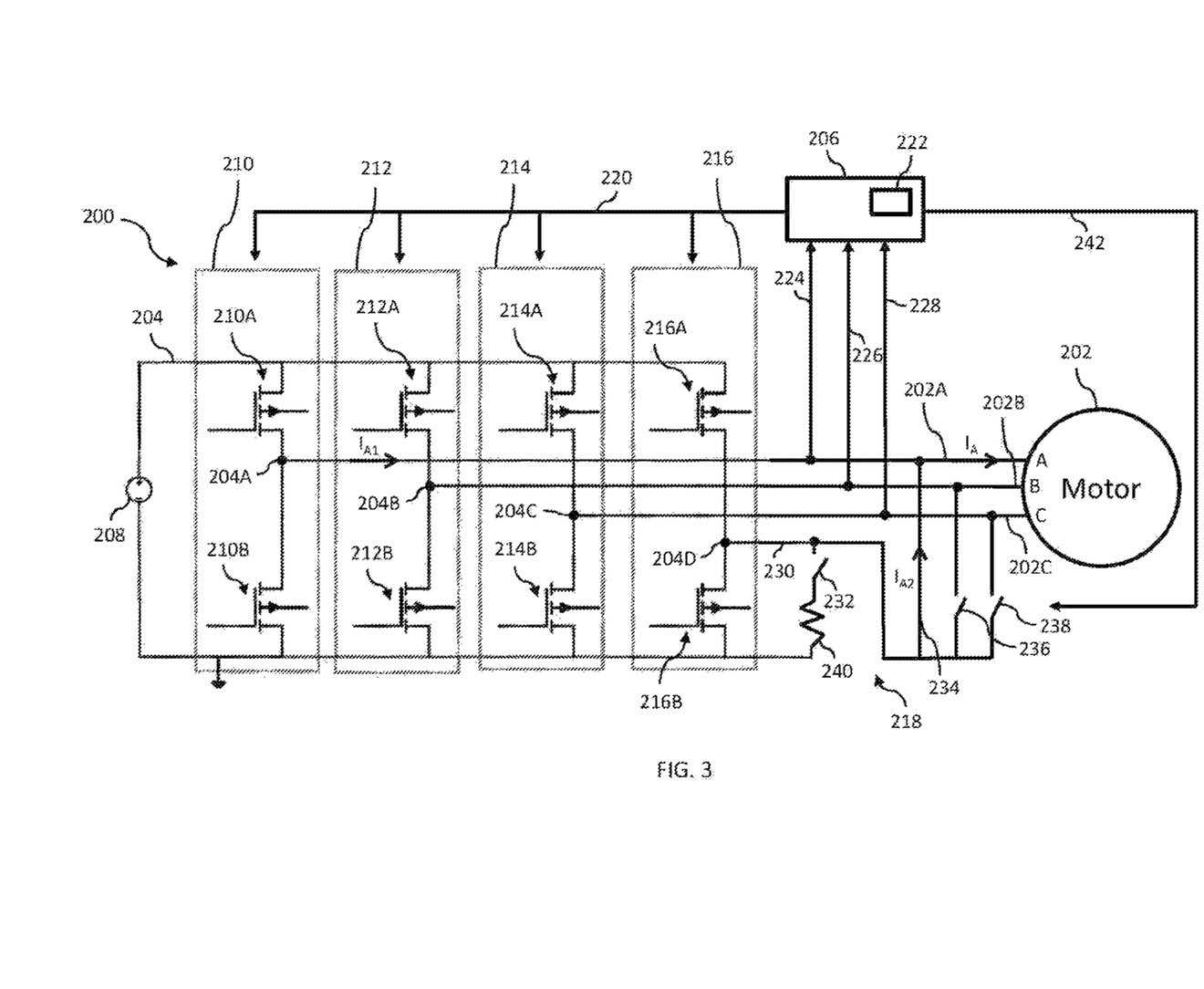
FIG. 3 is a block diagram illustrating operations of the fault-tolerant three-phase system of FIG. 2 under a partial phase loss fault.

FIG. 3 illustrates a situation where phase A (winding 202A) of AC motor 202 is experiencing a partial phase loss fault. In this scenario, a reduced current $I_{A1}$ is outputted from terminal 204A. Upon detecting the partial phase loss fault, controller 206 sends control signal 220 to activate auxiliary inverter leg 216 and sends a control signal 242 to close leg switch 230 and fault switch 234 in order to supplement energy from auxiliary inverter leg 216 to phase A. Other leg switch 232 and fault switches 236, 238 are kept open in this scenario. If auxiliary inverter leg 216 is already activated, then controller 206 may send control signal 242 to open leg switch 232 and close fault switch 234, with leg switch 230 remaining closed and fault switches 236, 238 remaining open. In any event, opening fault switch 232 allows an additional current $I_{A2}$ from auxiliary inverter leg 216 to be added to phase A. This results in a total phase current $I_A$, where $I_A=I_{A1}+I_{A2}$. Current $I_{A2}$ supplies the deficient energy needed by phase A in view of the partial phase loss fault. It should be noted that auxiliary inverter leg 216 can only support one faulty phase at a time.

In some embodiments, controller 206 may send control signal 220 to a separate controller (e.g., a gate controller) responsible for operating inverter legs 210-216. Similarly, controller 206 may send control signal 242 to a separate controller (e.g., a switch controller) responsible for operating connection switches 218.

Auxiliary inverter leg 216 can also be employed to provide continuous health monitoring of AC motor 202. In this mode of operation, each of the phases A-C in three-phase AC motor 202 may be connected to auxiliary inverter leg 216 (e.g., switches 230, 234-238 being closed and switch 232 being open). Controller 206 then injects a signal to each of the phases A-C (e.g., superimposed on the regular signal) through auxiliary inverter leg 216. The signal may be a high-frequency signal with a small amplitude. The injected signal should not impact system operation. That is, the frequency of the injected signal should not be the same as the operating frequency or switching frequency or the harmonics of both of those frequencies. Once injected, controller 206 can analyze the frequency response of the signal in each of the phases. For example, controller 206 can compare the impedance in a phase in response to the signal against an expected impedance. Based on the comparison, a partial imbalance in the phases can be identified. This health monitoring of three-phase motor 202 can be accomplished during normal operations at regular intervals.

Figure 4:
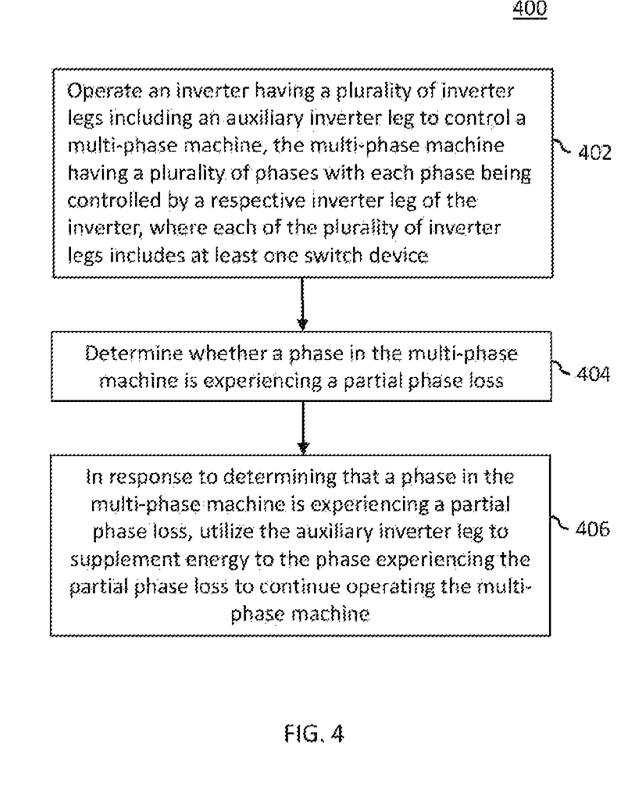
FIG. 4 is a flow chart illustrating a method for operating the fault-tolerant three-phase system of FIG. 2.

Referring now to FIG. 4, a method 400 for operating a multi-phase machine is shown. The multi-phase machine may be a three-phase machine such as a three-phase motor (e.g., 202). Method 400 can be performed by a controller (e.g., 206). At block 402, the controller is initially operating an inverter (e.g., 204) to control the multi-phase machine. The inverter has a plurality of inverter legs (e.g., 210-214) including an auxiliary inverter leg (e.g., 216). Each of the plurality of inverter legs includes at least one switch device. The multi-phase machine has a plurality of phases where each phase is controlled by a respective inverter leg of the inverter.

At block 404, the controller determines whether a phase in the multi-phase machine is experiencing a partial phase loss. The controller includes or can communicate with a fault detection unit (e.g., 222) to determine a fault condition that is causing the partial phase loss in the phase (e.g., partial winding damage). The controller can generate a signal to indicate the fault condition.

At block 406, in response to determining that a phase in the multi-phase machine is experiencing a partial phase loss, the controller utilizes (e.g., activates) the auxiliary inverter leg to supplement energy to the phase experiencing the partial phase loss to continue operating the multi-phase machine.

When utilizing the auxiliary inverter leg to supplement energy, the controller operates a set of one or more connection switches to connect the auxiliary inverter leg to the phase experiencing the partial phase loss. By connecting the auxiliary inverter leg to the phase experiencing the partial phase loss, an additional current is supplied from the auxiliary inverter leg to the phase experiencing the partial phase loss.

When determining whether a phase is experiencing a partial phase loss, the controller detects whether a partial imbalance exists in the plurality of phases in the multi-phase machine. In one example, the controller detects the partial imbalance by comparing the phase-to-neutral voltages for the plurality of phases in the multi-phase machine and determining whether a difference between the phase-to-neutral voltages is equal to, greater than, or less than a threshold, depending upon the embodiment. In another example, the controller detects the partial imbalance by injecting a signal into each of the plurality of phases in the multi-phase machine through the auxiliary inverter leg and analyzing a frequency response of the signal in each of the plurality of phases to determine whether the partial imbalance exists.

As described herein, by utilizing auxiliary inverter leg 216 with a proper control strategy, the fault tolerance capability of system 200 can be significantly improved. This further enhances the reliability of system 200 (e.g., by at least 33%) for use in a variety of applications such as in electric vehicles and the aerospace industry.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   operating, by a controller, an inverter having a plurality of inverter legs including an auxiliary inverter leg to control a multi-phase machine, the multi-phase machine having a plurality of phases with each phase being controlled by a respective inverter leg of the inverter, each of the plurality of inverter legs including at least one switch device;
   determining, by the controller, whether a phase in the multi-phase machine is experiencing a partial phase loss; and
   in response to determining that the phase in the multi-phase machine is experiencing a partial phase loss, utilizing, by the controller, the auxiliary inverter leg to supplement energy to the phase experiencing the partial phase loss to continue operating the multi-phase machine.

2. The method of claim 1, wherein utilizing the auxiliary inverter leg to supplement energy comprises operating a set of connection switches to connect the auxiliary inverter leg to the phase experiencing the partial phase loss.

3. The method of claim 2, wherein connecting the auxiliary inverter leg to the phase experiencing the partial phase loss comprises supplying an additional current from the auxiliary inverter leg to the phase experiencing the partial phase loss.

4. The method of claim 1, wherein determining whether the phase is experiencing a partial phase loss comprises detecting a partial imbalance in the plurality of phases in the multi-phase machine.

5. The method of claim 4, wherein detecting the partial imbalance comprises comparing phase-to-neutral voltages for the plurality of phases of the multi-phase machine and determining whether a difference between the phase-to-neutral voltages is equal to a threshold.

6. The method of claim 4, wherein detecting the partial imbalance comprises injecting a signal into each of the plurality of phases in the multi-phase machine through the auxiliary inverter leg and analyzing a frequency response of the signal in each of the plurality of phases to determine whether the partial imbalance exists.

7. A controller, comprising:
   a processor; and
   a memory including instructions that, when executed by the processor, cause the controller to:
   operate an inverter having a plurality of inverter legs including an auxiliary inverter leg to control a multi-phase machine, the multi-phase machine having a plurality of phases with each phase being controlled by a respective inverter leg of the inverter, each of the plurality of inverter legs including at least one switch device;
   determine whether a phase in the multi-phase machine is experiencing a partial phase loss; and
   in response to determining that the phase in the multi-phase machine is experiencing a partial phase loss, utilize the auxiliary inverter leg to supplement energy to the phase experiencing the partial phase loss to continue operating the multi-phase machine.

8. The controller of claim 7, wherein the instructions, when executed by the processor, to cause the controller to utilize the auxiliary inverter leg to supplement energy further cause the controller to operate a set of connection switches to connect the auxiliary inverter leg to the phase experiencing the partial phase loss.

9. The controller of claim 8, wherein connecting the auxiliary inverter leg to the phase experiencing the partial phase loss comprises supplying an additional current from the auxiliary inverter leg to the phase experiencing the partial phase loss.

10. The controller of claim 7, wherein the instructions, when executed by the processor, to cause the controller to determine whether the phase is experiencing a partial phase loss further cause the controller to detect a partial imbalance in the plurality of phases of the multi-phase machine.

11. The controller of claim 10, wherein the instructions, when executed by the processor, further cause the controller to detect the partial imbalance by comparing phase-to-neutral voltages for the plurality of phases of the multi-phase machine and determining whether a difference between the phase-to-neutral voltages is equal to a threshold.

12. The controller of claim 10, wherein the instructions, when executed by the processor, further cause the controller to detect the partial imbalance by injecting a signal to each of the plurality of phases of the multi-phase machine through the auxiliary inverter leg and analyzing a frequency response of the signal in each of the plurality of phases to determine whether the partial imbalance exists.

13. A system, comprising:
   an inverter having a plurality of inverter legs including an auxiliary inverter leg, each of the plurality of inverter legs including at least one switch device;
   a multi-phase machine having a plurality of phases; and
   a controller coupled to the inverter and the multi-phase machine, the controller configured to:
   operate the inverter to control the multi-phase machine with each phase being controlled by a respective inverter leg of the inverter;
   determine whether a phase in the multi-phase machine is experiencing a partial phase loss; and
   in response to determining that the phase in the multi-phase machine is experiencing a partial phase loss, utilize the auxiliary inverter leg to supplement energy to the phase experiencing the partial phase loss to continue operating the multi-phase machine.

14. The system of claim 13, further comprising a set of connection switches and the controller is configured to utilize the auxiliary inverter leg to supplement energy to the phase experiencing the partial phase loss by connecting the auxiliary inverter leg to the phase experiencing the partial phase loss through the set of connection switches.

15. The system of claim 14, wherein connecting the auxiliary inverter leg to the phase experiencing the partial phase loss comprises supplying an additional current from the auxiliary inverter leg to the phase experiencing the partial phase loss.

16. The system of claim 13, wherein the controller is configured to determine whether the phase is experiencing a partial phase loss by detecting a partial imbalance in the plurality of phases of the multi-phase machine.

17. The system of claim 16, wherein the controller is configured to detect the partial imbalance by comparing phase-to-neutral voltages for the plurality of phases of the multi-phase machine and determining whether a difference between the phase-to-neutral voltages is equal to a threshold.

18. The system of claim 16, wherein the controller is configured to detect the partial imbalance by injecting a signal to each of the plurality of phases of the multi-phase machine through the auxiliary inverter leg and analyzing a frequency response of the signal in each of the plurality of phases to determine whether the partial imbalance exists.

19. The system of claim 13, wherein the controller is further configured to detect a fault condition causing the partial phase loss in the phase and generate a signal to indicate the fault condition.

20. The system of claim 13, where the multi-phase machine is a three-phase machine.

* * * * *